United States Patent Office
3,808,098
Patented Apr. 30, 1974

3,808,098
BOILING WATER REACTOR CORE CONSTRUCTION
Bo Fredin, Vasteras, Sweden, assignor to Aktiebolaget Asea-Atom, Vasteras, Sweden
Filed Nov. 27, 1972, Ser. No. 309,658
Claims priority, application Sweden, Dec. 27, 1971, 16,628/71
Int. Cl. G21c 15/02
U.S. Cl. 176—54        2 Claims

ABSTRACT OF THE DISCLOSURE

A boiling water reactor core is composed of a plurality of elongated parallel fuel assemblies of square cross-section. Each assembly is composed of a plurality of parallel vertical fuel rods occupying the majority of the positions of the intersecting points in a regular lattice. The remainder of the positions are occupied by a tube which is filled with water during operation. The gaps between two adjacent sides of each fuel assembly and the adjacent fuel assemblies are wider than those between the other two adjacent sides of the same fuel assembly and the adjacent fuel assemblies, and a cruciform control rod has two wings movable in the wider gaps. The central axis of the tube is located on the diagonal joining the intersecting points of the wider pair of gaps to that of the narrower pair of gaps, and is closed to the latter intersection.

BACKGROUND OF THE INVENTION

(1) Field of the invention

The invention relates to a boiling water reactor core of the type constructed of a plurality of elongated fuel assemblies each with a plurality of parallel vertical fuel rods arranged in a regular grid.

(2) The prior art

Swedish Pat. 334,955 describes a boiling water reactor core which is constructed of a plurality of elongated, mutually parallel fuel assemblies having regular, substantially polygonal cross-section. Each fuel assembly comprises a plurality of parallel, vertical fuel rods arranged in a regular grid and a plurality of tubes, which among themselves form regular groups, arranged at the fuel rod positions in the grid. The tubes are arranged so that water flows through them during reactor operation, and, at least in a central area of the core, each fuel assembly is surrounded by a gap which contains water during reactor operation. The fuel rod grid has a construction which is at least mirror symmetrical. The gaps have such a width that the water in them and in the tubes during reactor operation is substantially uniformly distributed over the core section at a level where the sectional area enclosed by the tubes is fully occupied by the water. A core of this kind offers certain advantages, mentioned in the Pat. 334,955.

SUMMARY OF THE INVENTION

It has now been proved that the same advantages can be obtained if one single tube is introduced in a square fuel rod grid of conventional size, said tube replacing the previous group of tubing. A similar reactor core having only one special tube for water flowing vertically through the core is shown in FIG. 5 in Swedish Pat. 198,436. By using one single tube arranged in a central position in the fuel assembly, the moderator effect in relation to each fuel rod will be substantially the same, according to the last-mentioned patent, and the fuel elements or rods will operate substantially in a uniform neutron flow in the whole sectional area of the reactor core. In this way, the problem in connection with the presence of hot spots owing to non-uniform distribution of the neutron moderator is to a great extent overcome.

In a reactor core according to the invention, these advantages are achieved at least to the same degree as when using the means shown in FIG. 5 in the above-mentioned Swedish Pat. 198,436.

Further the advantage is achieved that, when controlling only in gaps between fuel assemblies and with the help of absorber rods designed with cruciform cross-section, it is possible to manage with only half the number of absorber rods required for the reactor core described in Patent 198,436. Since only half the number of gaps lying between adjacent fuel assemblies need to be dimensioned with such large width that sufficient room for the absorber rods is obtained, the remaining gaps may have a much smaller width. This means that a reactor core according to the invention makes better use of the room available for the core than the above-mentioned reactor core designed with a tube arranged centrally in the fuel assembly. The above-mentioned reduction in the gap width of half the gaps is made, according to the invention, without causing any deterioration of the internal power distribution (seen in comparison with the above-mentioned known device, designed with a central water tube). This is achieved because each fuel assembly is provided with a water tube and this is arranged in a special way eccentrically in relation to the axially running center line of the fuel assembly.

A reactor core according to the invention is characterized by the fact that each fuel assembly includes a plurality of fuel rods regularly distributed over the whole assembly section and occupying a majority of the lattice positions, the tube occupying the remainder of the lattice positions, through which water is conducted during operation. The gaps between two adjacent sides of the fuel assembly and the adjacent fuel assembly are substantially wider than the gaps between the other two sides of the fuel assembly and the fuel assemblies adjacent thereto and a cruciform control rod has two of its wings movable in the wider gaps. The tube is located on the diagonal from the intersection of the wider gaps to the intersection of the narrower gaps, and is closer to the latter intersection.

BRIEF DESCRIPTION OF THE DRAWINGS

In the following, the invention will be described with reference to the accompanying schematic drawings, in which.

DESCRIPTION OF THE PREFERRED EMBODIMENTS

Figure 1:
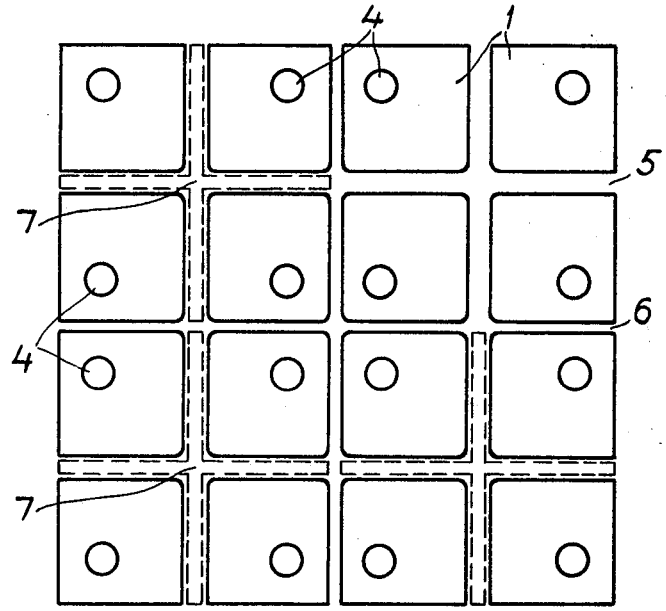
FIG. 1 shows a cross-section through sixteen fuel assemblies which are included in a reactor core, the remaining fuel assemblies of which, not shown, are constructed and arranged in the same way.
Figure 2:
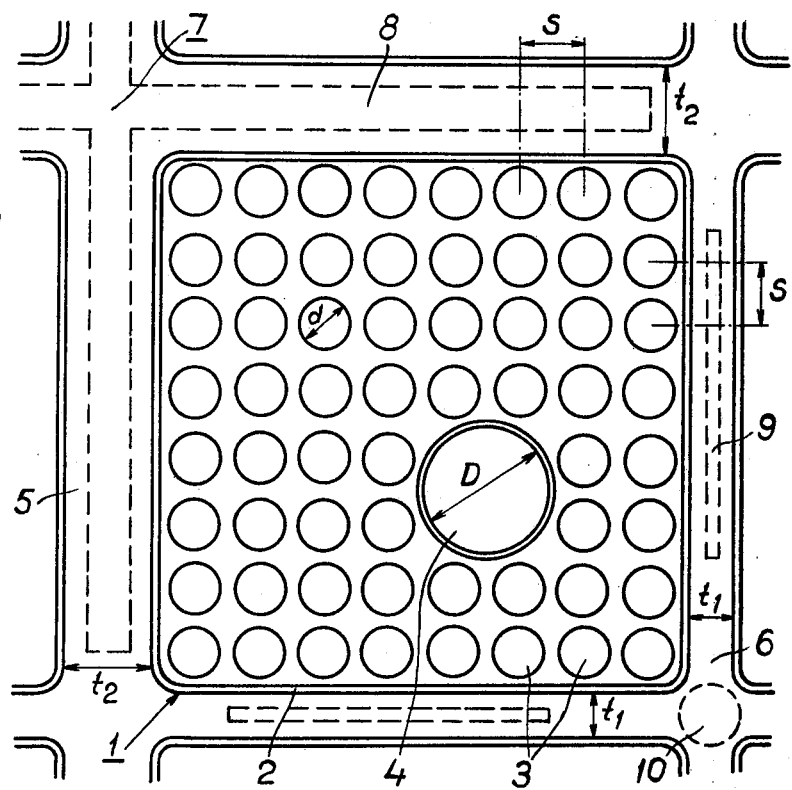
FIG. 2 shows more in detail a section of FIG. 1.

In the drawings, 1 designates a fuel assembly of substantially square cross-section. The fuel assembly 1 comprises a casing 2 containing a total of sixty fuel rods 3, which, by means of a spreader, not shown in the drawing, are arranged to occupy sixty of the sixty-four positions defined by a square lattice with 8 x 8 squares. The fuel assembly is a modification of a conventional 8 x 8 unit in which four of the fuel rods of such a unit are replaced by a water tube 4. Each fuel assembly is surrounded by one pair of gaps 5 of relatively large width $t2$ and one pair of gaps 6 of a smaller width $t1$. The fuel rods have circular cross-section and an outer diameter $d$. The inner diameter of the water tube 4 is $D$. As examples of suitable dimensioning the following measurements may be mentioned:

$t1 = 10.0$ mm.
$t2 = 19.5$ mm.
$D = 22.0$ mm.
$d = 12.7$ mm.
$S = 16.45$ mm.

The absorber rods 7 are of cruciform cross-section and arranged so they can be inserted with each of their four arms 8 in a gap 5. Neutron flow indicators 9 and 10 are arranged in the gaps 6. Water is used as coolant and moderator for the reactor core and flows vertically along the fuel rods 3 and through the water tube 4 and through the gaps 5 and 6.

Each fuel assembly then includes a plurality of fuel rods regularly distributed over the whole assembly section and occupying a majority of the lattice positions, the tube occupying the remainder of the lattice positions, through which water is conducted during operation. A cruciform control rod has two of its wings movable in the wider gaps. The tube is located on the diagonal from the intersection of the wider gaps to the intersection of the narrower gaps, and is closer to the latter intersection.

The tube wall of the water tube D may to advantage be perforated at its upper end. By doing so, part of the void will be extinguished so that a more even axial power distribution is obtained while at the same time cooling of the fuel is made easier.

What is claimed is:

1. Boiling water reactor core constructed of a plurality of elongated parallel fuel assemblies having regular, substantially square cross-section, each fuel assembly comprising a plurality of parallel, vertical fuel rods occupying a majority of a number of positions, regularly distributed over the whole assembly section, said positions corresponding to all the intersectional points in a regular, at least mirror symmetrical, lattice, the remainder of said positions being at least four in number and a single tube occupying said remainder positions, means to conduct water to said tube to flow therethrough during reactor operation, gaps separating the fuel assemblies, the gaps in at least the central area of the core including first and second pairs of gaps arranged perpendicularly to and adjacent to one another, means to feed water to said gaps during reactor operation, said first pair of gaps having a larger gap width, a control rod of cruciform cross-section having two arms within the gaps of the first pair, second pair of gaps having a considerably smaller gap width, said tube having its cross-sectional center on the diagonal between the corner points of said first and second pairs of gaps, said tube being further from the corner of said first pair of gaps than from the corner of said second pair of gaps.

2. Reactor core according to claim 1, in which said tube is perforated at its upper end.

References Cited
UNITED STATES PATENTS

| | | | |
|---|---|---|---|
| 3,132,076 | 5/1964 | West et al. | 176—50 |
| 3,481,832 | 12/1969 | Rickert | 176—50 |

HARVEY E. BEHREND, Primary Examiner

U.S. Cl. X.R.
176—61